(12) United States Patent
Nicola

(10) Patent No.: US 11,648,479 B2
(45) Date of Patent: May 16, 2023

(54) METHOD OF ELECTRONICALLY PLAYING AN OBJECT GUESSING GAME

(71) Applicant: Jacob Nicola, Portland, OR (US)

(72) Inventor: Jacob Nicola, Portland, OR (US)

( * ) Notice: Subject to any disclaimer, the term of this patent is extended or adjusted under 35 U.S.C. 154(b) by 0 days.

(21) Appl. No.: 17/347,883

(22) Filed: Jun. 15, 2021

(65) Prior Publication Data

US 2021/0394070 A1    Dec. 23, 2021

Related U.S. Application Data

(60) Provisional application No. 63/040,175, filed on Jun. 17, 2020.

(51) Int. Cl.
*A63F 13/655* (2014.01)
*A63F 13/79* (2014.01)
*A63F 13/332* (2014.01)

(52) U.S. Cl.
CPC .......... *A63F 13/655* (2014.09); *A63F 13/332* (2014.09); *A63F 13/79* (2014.09); *A63F 2300/305* (2013.01); *A63F 2300/638* (2013.01)

(58) Field of Classification Search
CPC ...... A63F 13/655; A63F 13/332; A63F 13/79; A63F 2300/305; A63F 2300/638
See application file for complete search history.

(56) References Cited

U.S. PATENT DOCUMENTS 6,279,911 B1 * 8/2001 Cherry .................. A63F 3/0423
273/272

2007/0024527 A1 * 2/2007 Heikkinen ............ A63F 13/235
345/9

(Continued)

OTHER PUBLICATIONS

10 Ways to Play "I Spy" by teacheveryday on Mar. 31, 2014 (available online: https://teachingeveryday.com/2014/03/31/10-ways-to-play-i-spy/) (Year: 2014).*

*Primary Examiner* — James S. McClellan
(74) *Attorney, Agent, or Firm* — Miller Nash LLP

(57) ABSTRACT

A computer-implemented method of playing a game includes receiving, at a user computing device, an image and a hint from a location remote to the user across a network, displaying the image and the hint on a user interface of the user computing device, receiving, from a user input device on the user computing device, a guess from a user, transmitting the guess from the user computing device across the network to a server, receiving, from the server, an indication of a correctness of the guess at the user computing device, and repeating the receiving, transmitting and receiving from the server until a predetermined limit expires or a guess having a correctness of a particular type is received. A computer-implemented method of playing a game includes taking a photograph at a first user computing device, receiving a hint associated with a scene in the photograph, transmitting the photograph and the hint to a second user through a game server, receiving, at the first user device, an indication of correctness of an answer received from the second user at the server, repeating the receiving, transmitting and receiving from the server until one of either a predetermined limit expires or the indication of correctness indicates a correct answer, and updating a user profile of the first user to reflect an outcome of the game.

2 Claims, 6 Drawing Sheets

(56) References Cited

U.S. PATENT DOCUMENTS

| | | | |
|---|---|---|---|
| 2014/0087797 A1* | 3/2014 | Siddharth | A63F 13/80 463/9 |
| 2016/0121205 A1* | 5/2016 | Sirois | A63F 9/0612 463/9 |
| 2018/0184014 A1* | 6/2018 | Goldstein | G06F 3/04817 |

* cited by examiner

METHOD OF ELECTRONICALLY PLAYING AN OBJECT GUESSING GAME

CROSS REFERENCE TO RELATED APPLICATION

This application claims priority to and the benefit of U.S. Provisional Application No. 63/040,175, filed Jun. 17, 2020, which is incorporated herein by reference in its entirety.

BACKGROUND

Many games require uses to be in proximity to each other. For example, the "I Spy" game typically involves two or more players sitting near each other so they can see the same scene. One user typically says something similar to, "I spy, with my little eye, something that is . . . " and then says a color, a shape, etc., The other users then get a number of guesses to guess what the first player saw. Obviously, players cannot play these types of games unless both users share the same view.

DETAILED DESCRIPTION OF THE EMBODIMENTS

Embodiments disclosed here provide users the ability to play games that otherwise would only be playable when the users were in the same location. The current embodiments involve "I Spy." Typically, in a game of I Spy, one user looks out a scene and says something like, "I spy, with my little eye, something that is . . . " and then gives a hint. Another user, looking at the same scene, then tries to guess what the other user sees. The users have to be in the same location in order to play the game.

With advent of computing devices, users can now play these games even when remote to each other. Multiple users in multiple locations can all play each other, which they would not otherwise have the ability to do. The embodiments here allow users to send images to each other so they can see the same scene.

Figure 1:
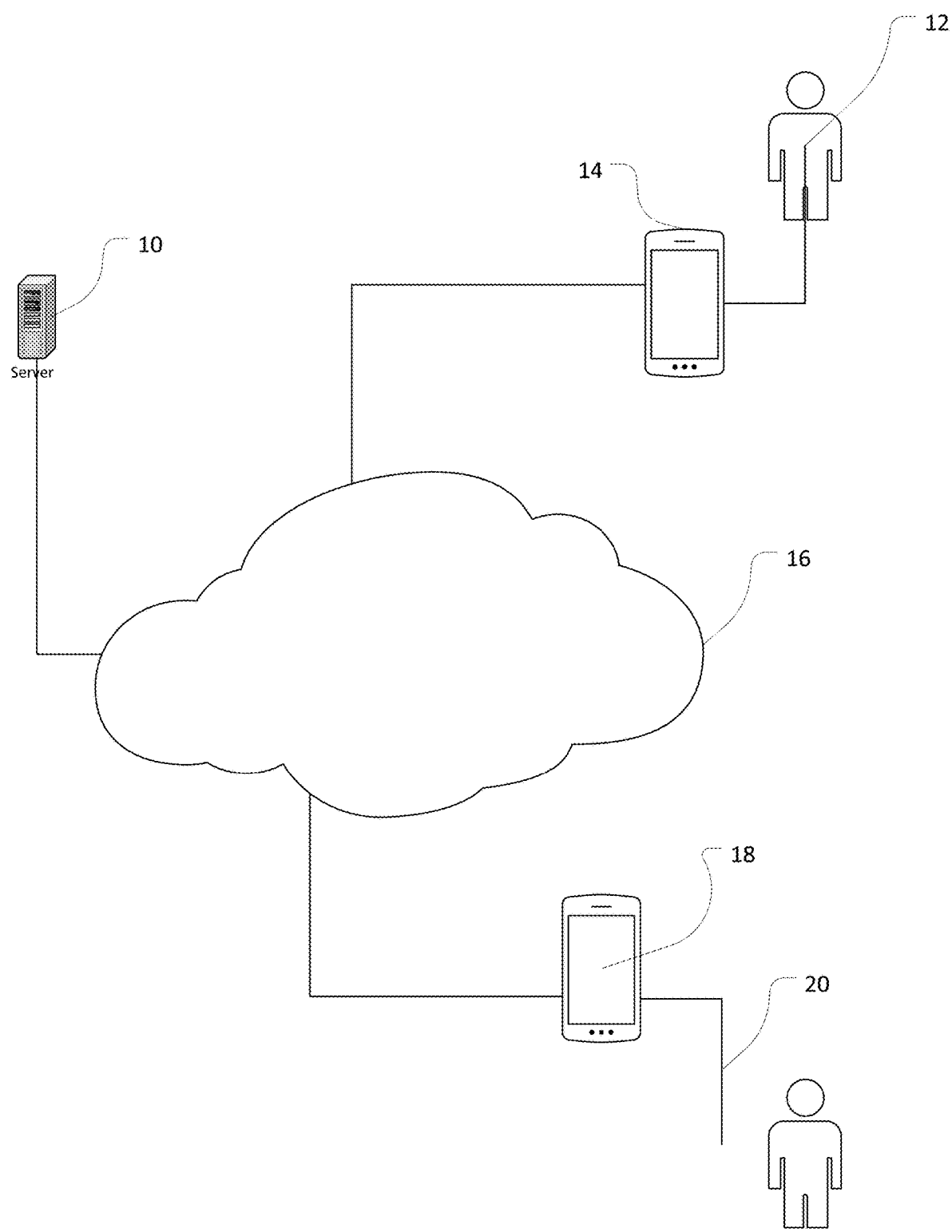
FIG. 1 shows a system level diagram of one embodiment of a system for playing a game with users remote from each other.

The game will operate in a system such as the one shown in FIG. 1. The game is available to users through a centralized game provider, such as the Apple® App Store, or Google® Play, and then runs on a game server 10, typically under control of the game provider or the game creator. A user 12 uses a mobile phone or other mobile platform 14 to connect to a network such as 16. The mobile phone may have a processor that operates software code to connect the device to the network and to operate the software of the game. A second user 20 users a second mobile device 18, that also operates software code to allow the second user to interact with the game. The server processor also operates the software code to interact with the two mobile devices.

The term mobile phone, or mobile device may comprise a portable electronic computing device such as a smart phone, tablet, laptop, or notebook computer. The computing device 14 may include one or more processors that may be configured to communicate with and are operatively coupled to some peripheral subsystems via a bus subsystem. These peripheral subsystems may include a storage subsystem/memory, one or more user input devices, in this embodiment a touch screen as part of the display, which also provides a user output interface, and one or more a network interfaces, also referred to as an adapter.

The network interface may provide an interface to other device systems and networks. The network interface may serve as an interface for receiving data from and transmitting data to other systems from the computing device 14. The network interface may include a wireless interface that allows the device 14 to communicate across wireless networks through a wireless access point, and may also include a cellular connection to allow the device to communicate through a cellular network. The network interface will allow the computing device 14 to communicate with one or more servers such as 10, which may include or provide access to a system data storage.

The device data store/memory may include one or more separate memory devices. It may provide a computer-readable storage medium for storing the basic programming and data constructs that may provide the functionality of at least one embodiment of the disclosure here. The data store may store the applications, which include programs, code modules, and instructions, that, when executed by one or more processors, may provide the functionality of one or more embodiments of the present disclosure. The data store may comprise a memory and a file/disk storage subsystem. In addition, the computing device 14 may store data on another computer such as server 10 accessible through the network 16 via the network interface.

The device may also include separate control buttons, or may have integrated control buttons into the display if the display consists of a touch screen. The device in this embodiment has a touch screen and possibly one or more buttons, not shown, on the periphery of the touch screen/display. Alternative user input devices may include buttons, a keyboard, pointing devices such as a mouse, trackball, touch pad, etc. In general, the use of the term 'input device' is intended to encompass all possible types of devices and mechanisms for inputting information into the device 14.

User output devices, in this embodiment the display/touch screen, may include all display subsystems, audio output devices, etc. The output device may present user interfaces to facilitate user interaction with applications performing processes described here and variations.

The discussion here refers to 'servers' or 'server computing devices.' In general, the server referred to here is a server computing device with a processor and a memory that operates on the user information and provides information back to the users relating to other users in the community of users that subscribe to the same service. Typically, there will be an application server computing device and a global positioning service server that will communicate with the user device or the server. Many of the functions described here may be performed by the application server, the user device, the GPS server. No limitation of any function being performed by one of the devices is intended nor should it be implied.

In the environment of the system of FIG. 1 the computing device 14 may be a client device. The network may consist of any appropriate network, including an intranet, the Internet, a cellular network, a local area network, a satellite network, or any other such network and/or combination of these. Components used for such a system can depend at least in part upon the type of network and/or environment selected. Protocols and components for communicating via such a network are well known and will not be discussed here in detail. Wired or wireless connections, or combinations of these, may enable communication over the network. In the embodiments here, the network includes the Internet and/or cellular communications. The application server 10 receives the requests and serves information in response to those requests via the network 16.

The application server 10 in combination with data store, or by itself, may consist of multiple servicers, layers or other elements, processors, or components, which may be chained, clustered, or otherwise configured, performs the tasks such as interacting with the client computing device and the data store. In some embodiments, some or all of the data store may be housed in or integrated with the application server 10. Servers, as used here, may be implemented in various ways, such as hardware devices or virtual computer systems. Server may refer to a programming module executed on a computing system. The term 'data store' refers to any device or combination of devices capable of storing, accessing, and retrieving data. This may include any combination and number of data servers, databases, data storages devices and media, in any standard, distributed, or clustered environment.

The application server 10 may include any appropriate hardware, software, and firmware for integrating with the data store as needed to execute aspects of one or more applications for the client device, handling some or all the data access and logic for an application. The application server may provide access control services in cooperation with the data store and is able to generate content including, but not limited to, text, graphics, audio, video and/or other content usable to be provided to the user, which may be served to the user by the web server in the form of Hyper-Text Markup Language ("HTML"), Extensible Markup Language ("XML"), JavaScript, Cascading Style Sheets ("CSS"), or another appropriate client-side structured language.

Content transferred to a client device such as 14 may be processed by the client device to provide the content in one or more forms including, but not limited to, forms that are perceptible to the user audibly, visually and/or through other senses including touch, taste, and/or smell. The handling of all requests and responses, as well as the delivery of content between the client device 14 and the application server 10, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store can include several separate data tables, databases, data documents, dynamic data storage schemes and/or other data storage mechanisms and media for storing data relating to an aspect of the present disclosure. For example, the data store illustrated may include mechanisms for storing temporary data and general data storage. The data store also is shown to include a mechanism for storing alert data, which can be used to generate one or more alerts as described above. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server 10 and obtain, update, or otherwise process data in response thereto. The application server 10 may provide static, dynamic or a combination of static and dynamic data in response to the received instructions. Dynamic data, such as data used in web logs (blogs), data streams, and other such applications may be generated by server-side structured languages as described herein or may be provided by a content management system ("CMS") operating on, or under the control of, the application server.

Each server typically will include an operating system that provides executable program instructions for the general administration and operation of that server and typically will include a computer-readable storage medium, such as a hard disk, random access memory, read only memory, etc., storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure here.

The environment can include a variety of data stores and other memory and storage media as discussed above. These can reside in a variety of locations, such as on a storage medium local to (and/or resident in) one or more of the computers or remote from any or all the computers across the network. In a set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer, or speaker). Such a system may also include one or more storage devices, such as disk drives, optical storage devices and solid-state storage devices such as random-access memory ("RAM") or read-only memory ("ROM"), as well as removable media devices, memory cards, flash cards, etc.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system in FIG. 1 should be taken as being illustrative in nature and not limiting to the scope of the disclosure.

Figure 2:
FIG. 2 shows an embodiment of a home screen of a mobile game.
Figure 3:
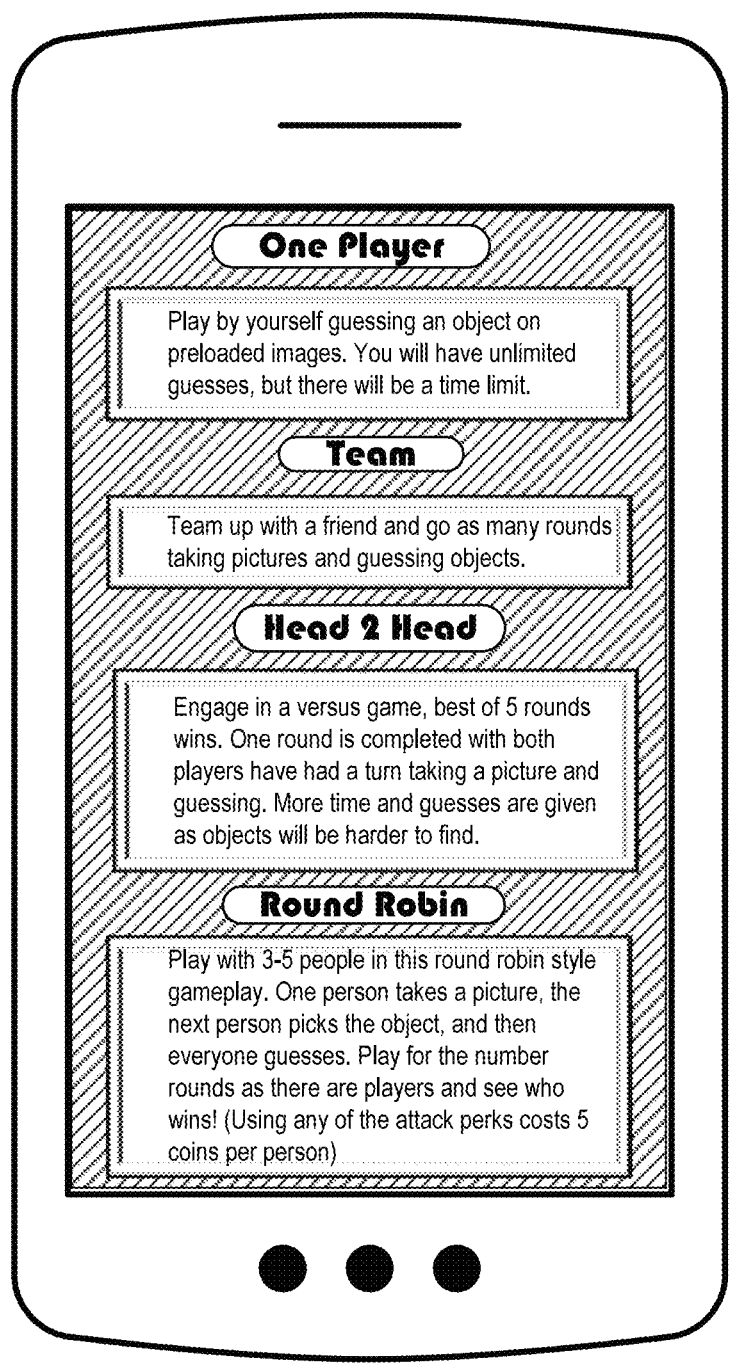
FIG. 3 shows an embodiment of a game selection screen.

In one embodiment, a starting user starts a game that user's mobile device from the home screen of the game. As used here, the "starting user" means the user that initiates the game, and the "playing user" means any game play that did not start the game. The starting user of course will also play the game. FIG. 2 shows an example of a game start screen. FIG. 3 shows a game selection screen with the different game options. The starting user may send an invitation for other player to play once the starting user selects which type of game to play, either from the starting user's contacts or from other registered users.

The invited user will receive the invite through the game server, if the invited user is a registered user for the game. If the invited user is not a registered user, the server or the user sending the invite may send an SMS message through a cellular network to invite the user to play, or through a social media channel such as Facebook® or SnapChat®. The invited user then has to download the game and register to play the game with the game server. Once the users have connected to each other, however they are do, the game commences as discussed in more detail below. The program may display a "pending games" screen, not shown, from which the invited user selects the game to play, based upon the other users in that game.

Figure 4:
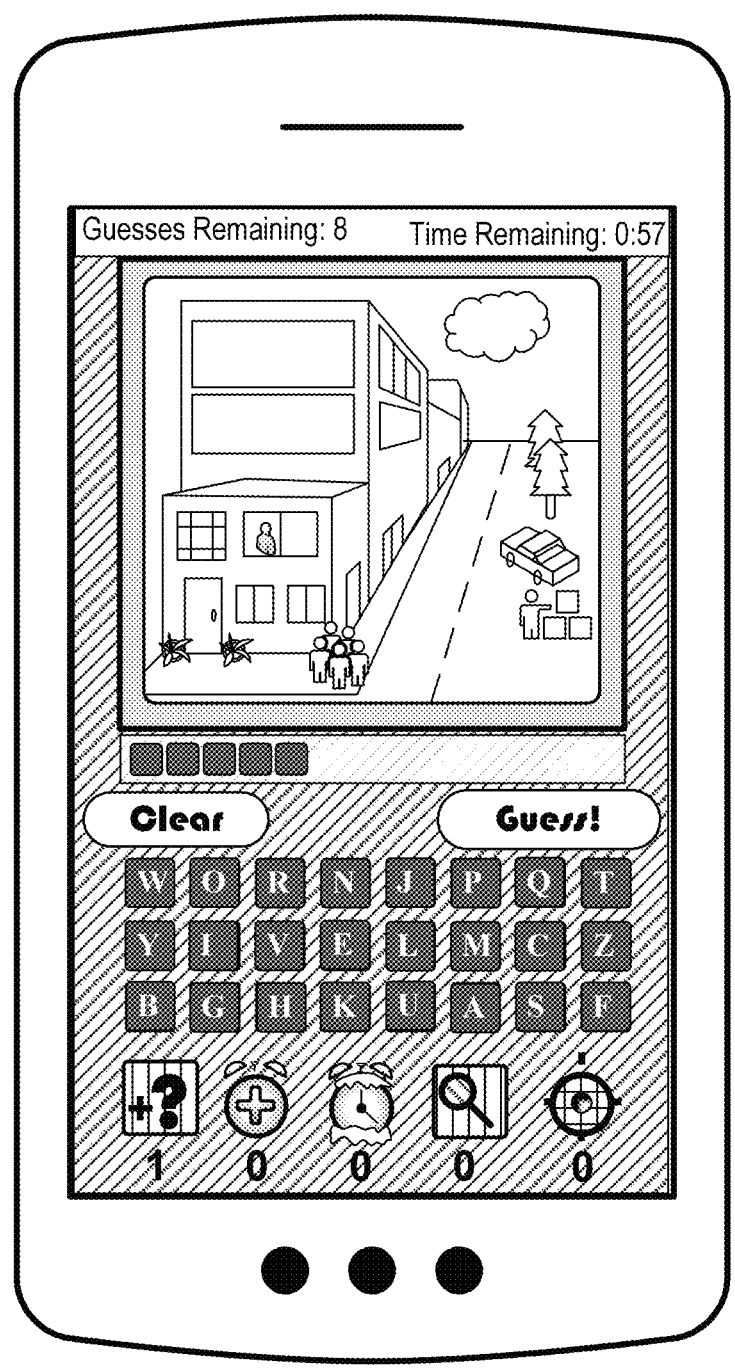
FIG. 4 shows an embodiment of an image and hint screen.
Figure 5:
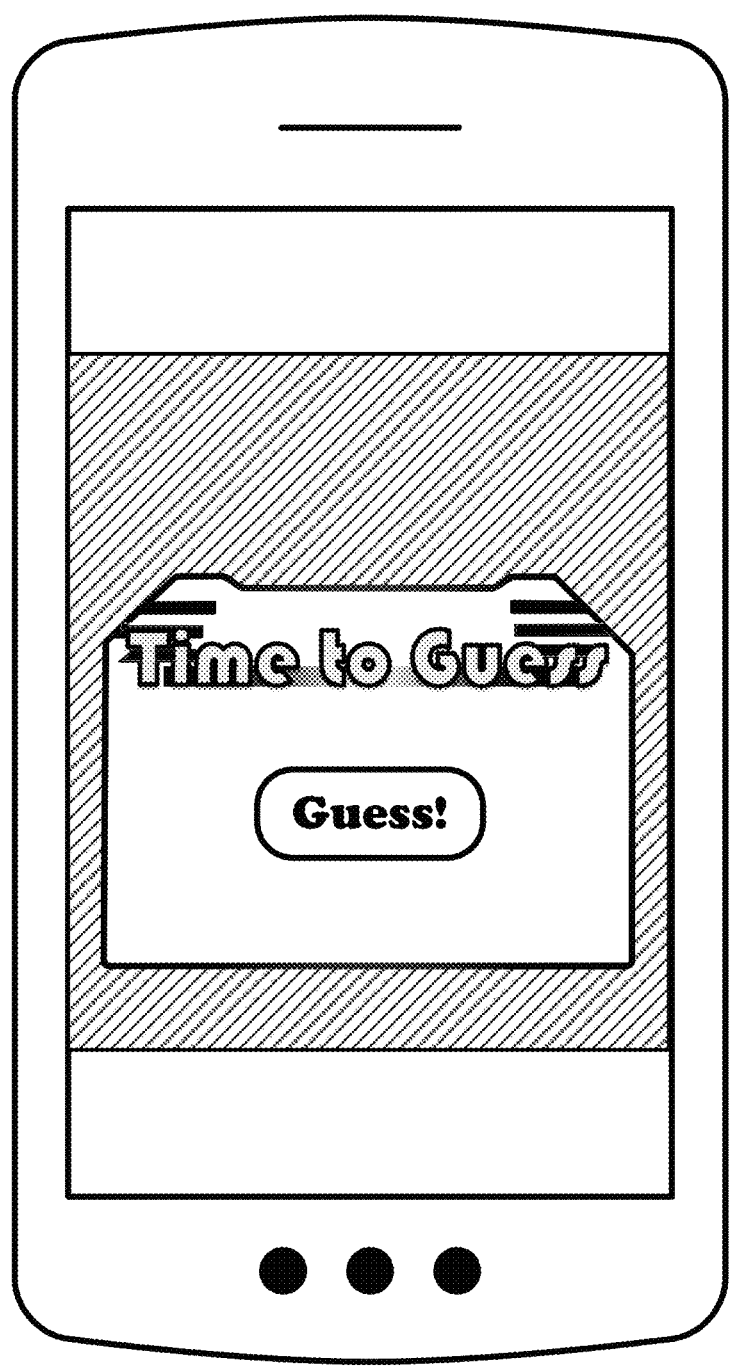
FIG. 5 shows an embodiment of a guess screen.

The user starting the game, takes a picture of a scene and enters a hint. In some embodiments, the hint takes the form of a word that identifies an object in the scene. After the user enters the hint, the game hides the letters, but provides blanks, boxes or something similar, to indicate how many letters are in the word. FIG. 4 shows an example of an image and hint screen.

The starting user may send the photograph and the hint to the server. The server then sends the image and the hint to the playing user. In head-to-head competitions, the starting user does not want the guessing user to guess the answer. The game provides some sort of limit to the guess user, such as a timer, or a number of guesses. The user guesses until either the answer comes back with an indication of correctness that matches the desired state, or the predetermined limit expires. The receiving user could then become the starting user and they can go back and forth some number of times determined by the server until the game ends. The winner user may receive an update to their profile that increases their coins or gives them a perk, which is some sort of an advantage or skill for future games.

The state of the indicated correctness would comprise something like "correct" or "incorrect." As stated above, in head-to-head play, the game continues until the limit expires or the indication of correctness equals correct, which each indication of correctness equaling incorrect continuing the process until the limit expires or the answer is correct. For team play, as discussed below, the game continues as long as the indication is correct, and stops when it becomes incorrect.

In a team environment, the two users continue to play until an incorrect answer is received. In this situation, each user wants the other user to guess correctly so they each maximize their ability gather rewards for correct answers. Upon an incorrect guess, the game will end.

In another embodiment, the users can play in a round robin fashion with multiple players in multiple locations. One user may take the photograph, and a second user may provide the hint for yet another user to make the guess. The other users then guess and one of them may or may not be correct. This may continue until a correct guess is received. The roles are then re-assigned to different users and the game progresses. The user taking the photograph and the user providing the hint will not be the same users as in the previous round.

In yet another embodiment, a user could play an individual game. The user could start a game and the user would receive images from the server. The server may send an image to the user. The image may comprise a photograph, such as one that users would receive in a user to user game, or it may comprises a computer-generated graphic. The server would provide a hint as well. The user would then play the game against the server.

In this manner, two users or two teams of users can play each other by sending each other images of a captured scene. The receiving user or users then tried to guess what the sending user spied. This allows user to play I Spy distantly.

Figure 6:
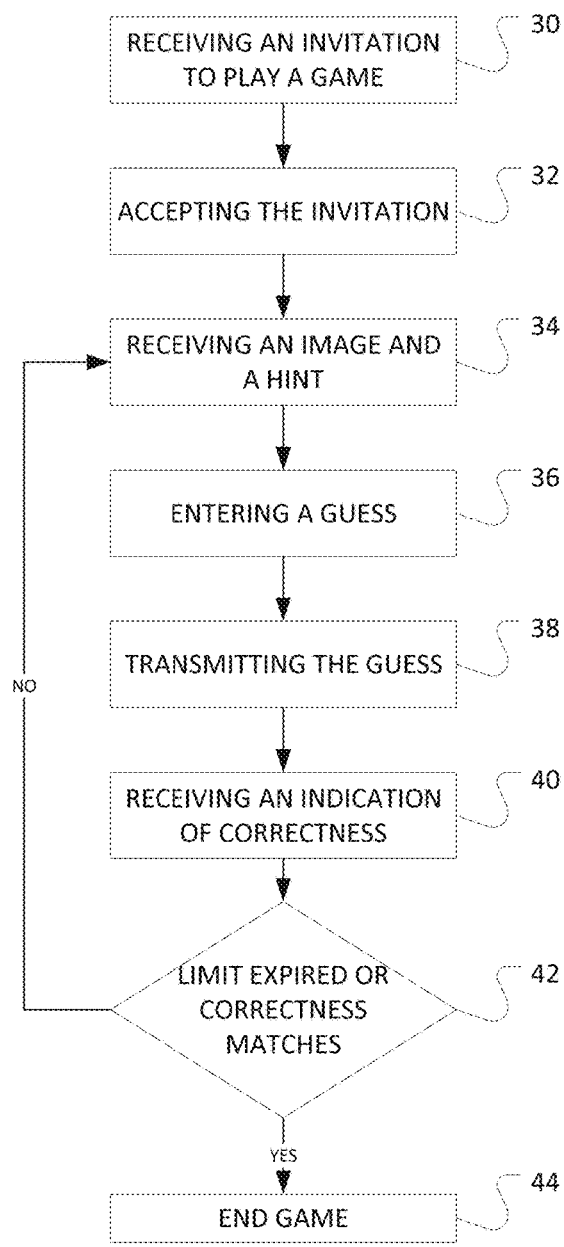
FIG. 6 shows a method of participating in a mobile game at a receiving device.

FIG. 6 shows a method of playing a game with users remote from each other but with a shared scene from the point of view of the playing user. The playing user will typically be the receiving user in the first round, having been invited to play. Similarly, the inviting user will typically be the transmitting player in the first round, because the inviting user started the game. However, once the game has started either the invited or playing user could be the transmitting or receiving user.

As discussed above the process may not take different forms depending upon whether the invited/playing user already has an account as a registered user in the game system. The playing user receives an invitation at 30, and then accepts the invitation at 32. This may include directing the playing user to a pending games screen not shown. These processes are optional and will only occur if the receiving user is the playing user. After these two processes, the remaining processes may occur at any receiving user, either inviting or playing. At 34, the receiving user receives an image and a hint. As previously discussed, the image and hint may come from one or more users, from head-to-head, team, or round-robin play.

The receiving user's mobile device receives the image and hint from the game server, the game server then starts the countdown timer, or number of guesses, etc., and the user's mobile device presents the image, hint, and limit on the user interface of the mobile device. The receiving user then enters a guess through the user controls on the user interface, typically a touch screen. In one embodiment, the hint takes the form of a set of blocks or other blanks for which the playing user provides letters of a word to enter as a guess.

The receiving user's mobile device then transmits the guess to the server, which returns an indication of correctness at 40. As stated above, for team play, if the indicator is correct, the game continues at 42, because the ending indicator for a team is "incorrect." If the players are playing head-to-head, and the indicator is "correct," the game or round may end at 44 if the indicator is "correct." It depends upon the game, number of rounds, etc. The game may have many different variations on the basic process handled by the playing user's device, such as where receiving the image and the hint from a location remote to the user means receiving a photograph captured by a second user, or receiving an image produced by the server as in one-player games. If the user is playing a one-play game the server may send an existing photograph from a library or may send a computer-generated graphic. In round-robin play the image may "be received" from one user and the hint from another. "Be received" as used here means that the receiving user actually receives the image and hint from the server, but they are generated by different users. In the discussion above and below, the "receiving" is done at the user device from the server, but the references to it being from other users means that those users generated the content, such as the image or the hint and sent it to the server.

After completion of the game, the users may receive updates to their user profiles to include awards, in the form of points, coins or other game currency that allows the user to purchase skills or other advantages, which may be referred to as perks.

Figure 7:
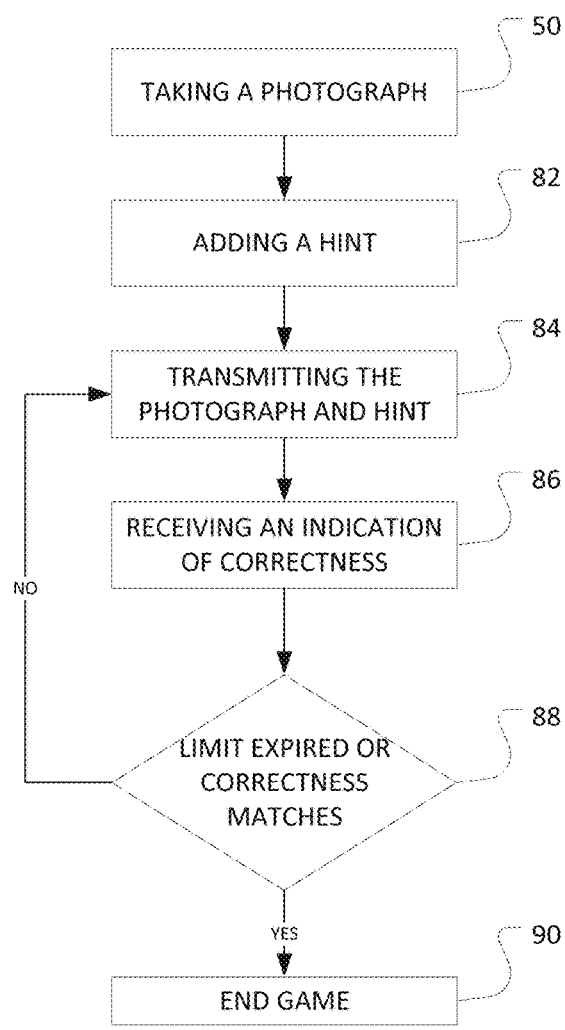
FIG. 7 shows a method of participating in a mobile game at a transmitting device.

FIG. 7 shows the game as viewed from the transmitting player's mobile device. The transmitting user takes a photograph. In head-to-head and team play, the transmitting user adds a hint at 82. The hint may also be added by a second transmitting user in a round-robin game, in which case the second transmitting user's mobile device would send the photograph and hint to the server.

From the perspective of the transmitting user's mobile device, no further interaction with the server may occur until the server sends an indication of correctness is received from the server after the other user submits their guess. This process continues until the limit expires or the indicator of correctness does not match what is expected at 88. Once either of these events occur, the game ends at 90.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the embodiments.

The invention claimed is:

1. A computer-implemented method of electronically playing an object guessing game, comprising:
   receiving, at a game server, a photograph taken by a first user on a first user mobile device, wherein the photograph includes a scene with multiple objects;
   sending the photograph, from the game server, to a group of users at different locations, wherein the group of users includes the first user, a second user on a second mobile device, and a plurality of other users on other mobile devices;
   receiving at the game server a hint from the second user via the second mobile device, wherein the hint is a word that identifies a specific object in the photograph and receiving an indication of the hint shows a number of letters in the hint but does not show the word that identifies the specific object in the photograph;
   transmitting the indication of the hint to the plurality of other users in the group;
   receiving guesses of the word that identifies the specific object in the photograph from the plurality of other users in the group;
   identifying via the game server a correct guess from one of the plurality of users in the group;
   notifying via the game server the group of users of the correct guess and identifying the user among the plurality of other users that provided the correct guess; and
   updating a user profile of the identified user that provided the correct guess to receive an award.

2. The computer-implemented method as claimed in claim 1, further comprising repeating the method with a different user as the first user and a different user as the second user.

* * * * *